(12) United States Patent
Baur et al.

(10) Patent No.: US 11,325,516 B2
(45) Date of Patent: May 10, 2022

(54) STORAGE DEVICE FOR A VEHICLE

(71) Applicant: Bayerische Motoren Werke Aktiengesellschaft, Munich (DE)

(72) Inventors: Manuel Baur, Augsburg (DE); Andreas Beck, Waldbrunn (DE); Markus Riess, Eschenburg (DE); Nicolas Rojek, Burbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1 day.

(21) Appl. No.: 16/960,344

(22) PCT Filed: Dec. 20, 2018

(86) PCT No.: PCT/EP2018/086289
§ 371 (c)(1),
(2) Date: Jul. 7, 2020

(87) PCT Pub. No.: WO2019/134846
PCT Pub. Date: Jul. 11, 2019

(65) Prior Publication Data
US 2020/0369190 A1 Nov. 26, 2020

(30) Foreign Application Priority Data
Jan. 8, 2018 (DE) ............... 10 2018 200 186.3

(51) Int. Cl.
*B60N 3/10* (2006.01)
*B60R 11/00* (2006.01)

(52) U.S. Cl.
CPC .......... *B60N 3/102* (2013.01); *B60R 11/00* (2013.01); *B60R 2011/0007* (2013.01)

(58) Field of Classification Search
CPC .. B60N 3/102; B60R 11/00; B60R 2011/0007
(Continued)

(56) References Cited

U.S. PATENT DOCUMENTS 5,996,866 A * 12/1999 Susko ................ B60R 11/0241
224/281
6,923,517 B2 * 8/2005 Yamamoto ............ B60N 3/102
248/311.2
(Continued)

FOREIGN PATENT DOCUMENTS

DE  92 12 168 U1  11/1992
DE  93 08 232 U1  9/1993
(Continued)

OTHER PUBLICATIONS

International Search Report (PCT/ISA/210) issued in PCT Application No. PCT/EP2018/086289 dated Feb. 15, 2019 with English translation (six (6) pages).
(Continued)

*Primary Examiner* — Pinel E Romain
(74) *Attorney, Agent, or Firm* — Crowell & Moring LLP (57) ABSTRACT

A storage device for a vehicle includes a housing, a drawer which can be moved relative to the housing along a vehicle longitudinal direction between a closed state and an open state when used as intended, and a plate which is mounted by way of a bearing device attached to the drawer such that the plate can be pivoted about a pivot axis extending along a vehicle transverse direction.

14 Claims, 5 Drawing Sheets

(58) Field of Classification Search
USPC .................................................. 296/24.34
See application file for complete search history.

(56) References Cited

U.S. PATENT DOCUMENTS

| | | | | |
|---|---|---|---|---|
| 7,278,681 | B2* | 10/2007 | Lilov | ................... B60R 7/04 |
| | | | | 297/188.17 |
| 9,902,338 | B2* | 2/2018 | Wirkner | ............. B60R 11/0241 |
| 9,902,339 | B2* | 2/2018 | Gilling | ................. B60R 11/02 |
| 10,377,319 | B2* | 8/2019 | Muiter | ............. B60R 11/0241 |
| 10,793,081 | B2* | 10/2020 | Tena Han | ............. B60R 11/02 |
| 10,793,082 | B2* | 10/2020 | Harris | ................. B60R 11/02 |
| 2003/0090130 | A1 | 5/2003 | Schaal | |
| 2003/0234550 | A1* | 12/2003 | Brooks | ............. B60R 11/0211 |
| | | | | 296/24.46 |
| 2010/0090491 | A1* | 4/2010 | Hipshier | ................. B60R 7/04 |
| | | | | 296/24.34 |
| 2017/0324853 | A1* | 11/2017 | Ranganathan | .......... H04M 1/04 |
| 2018/0162283 | A1* | 6/2018 | Ranganathan | .......... B60R 7/043 |
| 2019/0237986 | A1* | 8/2019 | Agarwal | ............... H02J 50/10 |

FOREIGN PATENT DOCUMENTS

| | | | |
|---|---|---|---|
| DE | 101 38 292 A1 | 3/2003 | |
| DE | 101 55 798 A1 | 5/2003 | |
| DE | 10234108 A1 * | 3/2004 | ............... B60N 3/08 |
| DE | 20 2007 011 662 U1 | 11/2007 | |

OTHER PUBLICATIONS

German-language Written Opinion (PCT/ISA/237) issued in PCT Application No. PCT/EP2018/086289 dated Feb. 15, 2019 (six (6) pages).
German-language Search Report issued in German Application No. 10 2018 200 186.3 dated Dec. 10, 2018 with partial English translation (11 pages).

* cited by examiner

STORAGE DEVICE FOR A VEHICLE

BACKGROUND AND SUMMARY OF THE INVENTION

The present invention relates to a storage unit for a vehicle, in particular a storage unit which is integrated in a center console of the vehicle, and also to a center console of a vehicle and to a vehicle equipped with the storage unit.

Vehicles typically have a plurality of storage units for storing and receiving articles. For example in addition to operator control elements for activating electronic devices of the vehicle, a shift lever and a handbrake handle, known center consoles of a motor vehicle also comprise fixed or displaceable storage units for receiving drink cups or for storing and charging a mobile device, such as, for example, a cell phone.

Since the installation space for these fixed or displaceable storage units, which can also have a cover for closing a storage compartment of the storage unit, does not change even if they are not required, the available space in the interior of the vehicle is restricted unnecessarily.

It is therefore an object of the present invention to provide a storage unit for a vehicle with which the available space in the interior of the vehicle, in particular in the region in front of the center console of the vehicle, can be increased if the storage unit is not required for the storage of an article.

According to one embodiment, a storage unit for a vehicle comprises a housing and a drawer. The drawer, during intended use, can be moved, relative to the housing, along a vehicle longitudinal direction, between a closed state and an open state. A plate is supported, by means of a bearing unit which is attached to the drawer, in such a way that the plate can be pivoted about a pivot axis which extends along a vehicle transverse direction, and which has an end which is at the front with respect to a vehicle forward direction and an end which is at the rear with respect to the vehicle forward direction. A pivot mechanism is configured to change a pivot angle of the plate relative to the vehicle longitudinal direction in such a way that the pivot angle of the plate in the closed state is greater than the pivot angle of the plate in the open state. The plate is configured so that, in the open state of the drawer, it can be used as a base plate of a storage compartment which is intended for storing an article, and/or has a hole which is configured so that, in the open state of the drawer, it can receive a drink cup.

In this case, the storage unit can be configured in particular in such a way that, in order to open the drawer, which, in the closed state, is at least partially received in the housing, the drawer is moved in the direction of the vehicle forward direction, such that the storage compartment for storing the article or for receiving the drink cup is provided, in the open state, at a front end of the storage unit.

As a result of the fact that, relative to the vehicle longitudinal direction, the pivot angle of the plate in the closed state of the drawer is greater than the pivot angle of the plate in the open state of the drawer, only a small amount of installation space for receiving the plate is necessary along the vehicle longitudinal direction in the closed state of the drawer. In this way, the installation space which is saved in the closed state, with respect to the vehicle longitudinal direction, can advantageously be used for the provision of other components.

The pivot mechanism is preferably configured to change the pivot angle of the plate, depending on a position of the drawer relative to the housing, along the vehicle longitudinal direction in such a way that, with respect to a vehicle vertical direction, the rear end of the plate is located at a lower level in the closed state than in the open state. In this way, the plate, in the closed state of the drawer, is received completely in an interior of the drawer, such that the plate is not visible.

At the front end of the plate, provision can be made for a first and a second bearing journal which extend in opposite directions along the vehicle transverse direction, with the bearing unit comprising a first bearing device, which supports the first bearing journal, and a second bearing device, which supports the second bearing journal.

In this case, at the front end of the plate, provision can be made for a first through-hole which extends along the vehicle transverse direction, a first shaft being provided in the first through-hole, the first and the second bearing journals being formed by a respective end of the first shaft, said end projecting from the first through-hole, and the first and the second bearing devices being formed by a respective rotary bearing which is configured in a respective side wall of the drawer.

The rotary bearings which are configured in the respective side walls of the drawer can be configured, for example, in the form of blind holes which extend, in the vicinity of an end of the drawer which is at the front with respect to the vehicle forward direction, from a respective inner side of a respective side wall of the drawer, in opposite directions along the vehicle transverse direction. In another embodiment, the rotary bearings can also be configured in the form of through-holes which extend through the respective side wall of the drawer.

The pivot mechanism can have at least one guide rail and at least one guide pin, which engages into the at least one guide rail, the storage unit being configured in such a way that, during a movement of the drawer relative to the housing along the vehicle longitudinal direction, the at least one guide pin moves along a guide path relative to the at least one guide rail, said guide path being defined by the at least one guide rail, and the pivot angle of the plate is changed as a result of the relative movement of the at least one guide pin with respect to the at least one guide rail.

According to one embodiment, the at least one guide rail is mounted on the housing, and the at least one guide pin is mounted on the plate.

Preferably, at the rear end of the plate, there are provided a first and a second guide pin which extend in opposite directions along the vehicle transverse direction, the at least one guide rail comprising a first guide rail, into which the first guide pin engages, and a second guide rail, into which the second guide pin engages.

In this case, at the rear end of the plate, provision can be made for a second through-hole which extends along the vehicle transverse direction, a second shaft being provided in the second through-hole, the first and the second guide pins being formed by a respective end of the second shaft, said end projecting from the second through-hole, and the first and the second guide rails being provided on a respective inner side surface of a respective side wall of the housing.

According to another embodiment, the at least one guide rail is mounted on a side surface of the plate, and the at least one guide pin is mounted on an inner side surface of a side wall of the housing.

Particularly in the case in which the plate is configured so that, in the open state of the drawer, it can be used as a base plate of a storage compartment which is intended for storing an article, the storage unit can further comprise a charging device, which is configured to wirelessly charge a rechargeable battery of a portable device when the portable device is resting on the plate.

In said case, it is further preferred for the pivot mechanism to be configured in such a way that, in a completely open state of the drawer, the front end of the plate is located at a higher position, with respect to the vehicle vertical direction, than the rear end of the plate. In particular, in the completely open state, the corresponding pivot angle of the plate can be adjusted, depending on the position of the plate in a vehicle, in such a way that a user has a good view, during travel, of a display of a smartphone which is placed on the plate. In this case, in the completely open state of the drawer, the pivot angle of the plate can be, for example, in the range of 15° to 30°.

According to one embodiment, a center console, in particular a self-supporting center console for a vehicle, comprises an above-described storage unit, with the housing of the storage unit being formed by a housing of the center console.

On an upper side of the center console, provision can be made for an operator control panel which has a plurality of switches or regulating elements for activating electronic devices of the vehicle. Furthermore, the operator control panel can also have a shift lever and/or a handbrake handle. In this case, the storage unit can be configured in particular in such a way that a bottom of the drawer is arranged, in the closed state, below the operator control panel. As a result of the fact that, relative to the vehicle longitudinal direction, the pivot angle of the plate in the closed state of the plate is greater than in the open state, it is possible for the installation space between the operator control panel and the bottom of the drawer to be used, in the closed state of the drawer, advantageously for other components, for example electrical components which are coupled to the operator control panel. In this way, the pivot angle of the plate in the closed state of the drawer is particularly preferably adjusted in such a way that it is virtually 90°. In other words, the pivot angle of the plate in the closed state of the drawer is adjusted in such a way that, with respect to the vehicle vertical direction, the rear end of the plate lies at a lower level than the front end of the plate, and the plate is inclined virtually perpendicularly with respect to the vehicle longitudinal direction.

According to one embodiment, a vehicle comprises an above-described center console, the center console extending between front seats of the vehicle, along the vehicle longitudinal direction.

Preferred embodiments of the invention are described below with reference to the drawings.

DETAILED DESCRIPTION OF THE DRAWINGS

Figure 1:
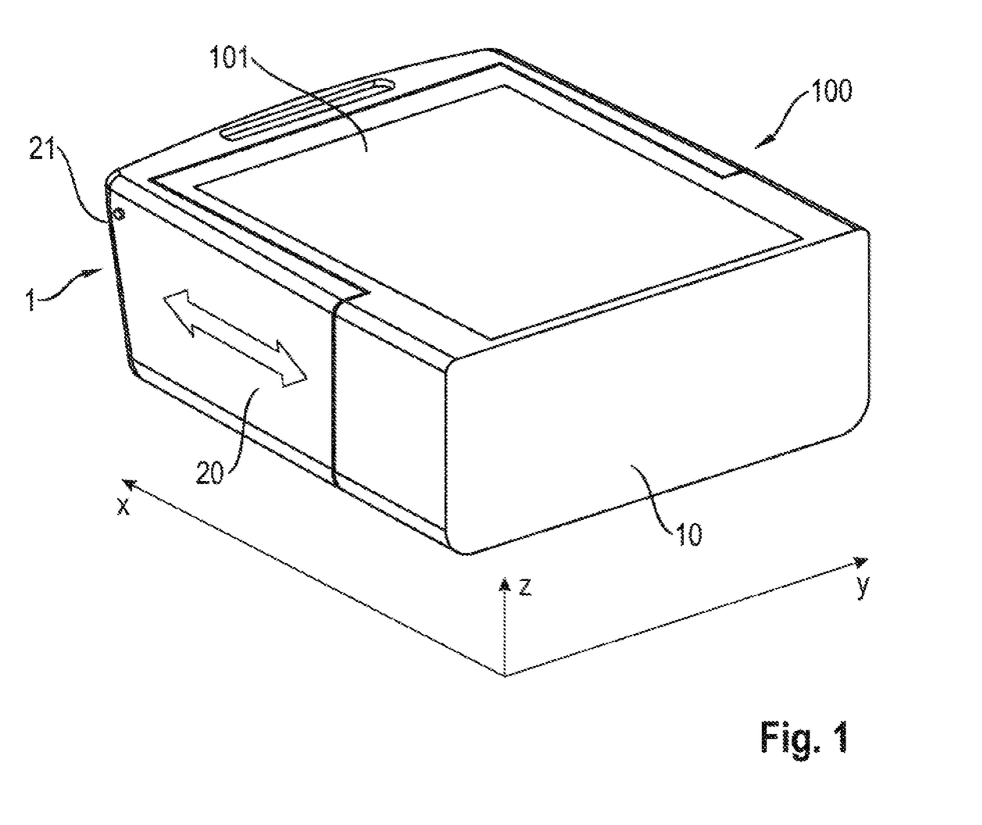
FIG. 1 is a schematic perspective view of a center console of a vehicle with a storage unit according to an embodiment of the invention.

FIG. 1 shows a schematic perspective view of a center console of a vehicle, in particular of a motor vehicle, which comprises a storage unit. The center console 100 is configured in the form of a self-supporting center console, which is configured to extend between front seats (not shown) of the vehicle. The center console 100 has an operator control panel 101 with a plurality of switches or regulating elements (not shown) for activating electronic devices of the vehicle. Furthermore, the operator control panel 101 can also have a shift lever (not shown) and/or a handbrake handle (not shown).

The storage unit 1 has a housing 10, which can be formed for example, as is shown in FIG. 1, by a housing of the center console 100, and a drawer 20. During intended use, that is to say when the storage unit 1 is mounted in a vehicle, the drawer 20 can be moved, as indicated by the double-headed arrow which is shown in FIG. 1, relative to the housing 10, along a vehicle longitudinal direction X, between a closed state and an open state. In this case, the storage unit 1 is configured in particular in such a way that, during the intended use, the drawer 20, in order to be opened, is moved in a vehicle forward direction, which corresponds to the X direction which is shown in FIG. 1.

The center console 100 can have a switch (not shown), which is coupled to a drive, which has for example an electric motor, for the purpose of moving the drawer 20, such that, when the switch is actuated by a user, the drawer 20 is displaced from the closed state to the open state, or from the open state to the closed state. In another embodiment, the drawer 20 can also be moved by the user manually displacing the drawer 20 forward or rearward. Preferably, the storage unit 1 has a latching device (not shown), which has the effect that the drawer 20 latches in in the completely open state and in the completely closed state. In said case, an unlocking unit (not shown) is further provided, with which the user can disable the latching action of the drawer 20.

Figure 2:
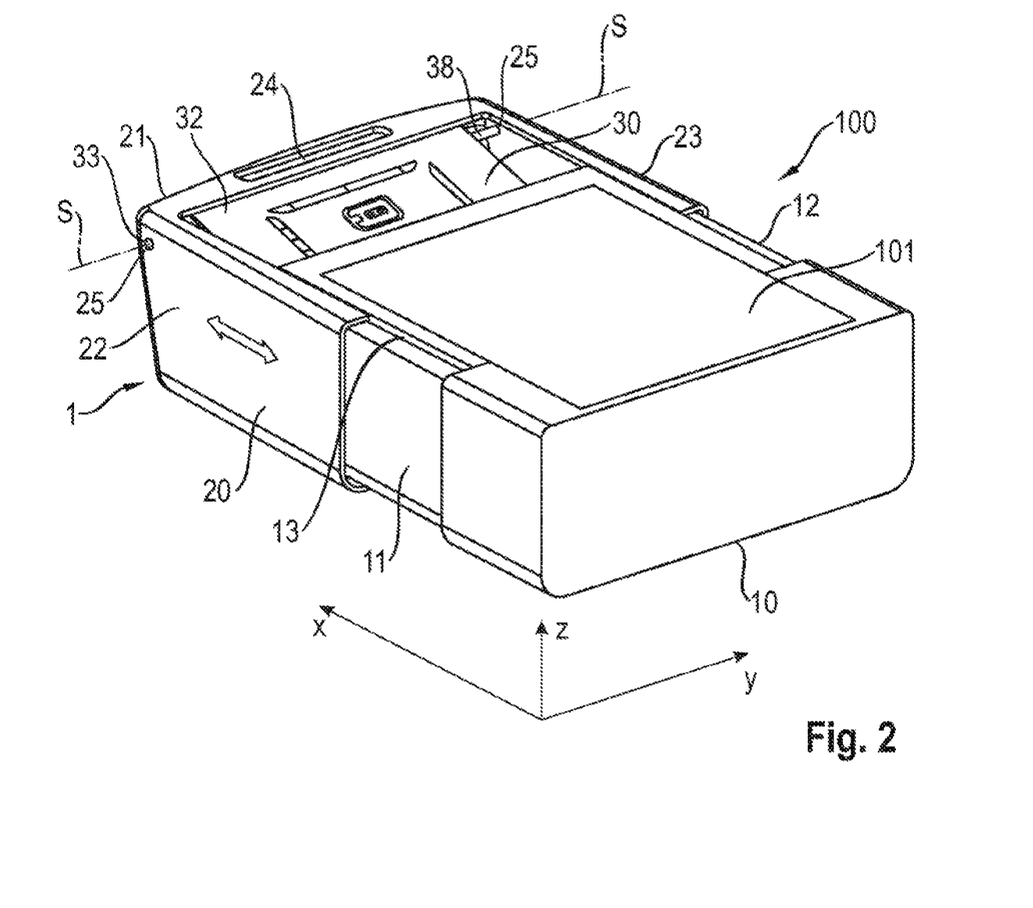
FIG. 2 is a schematic perspective view of a center console with a storage unit according to a first embodiment, when a drawer of the storage unit is in an open state.
Figure 3:
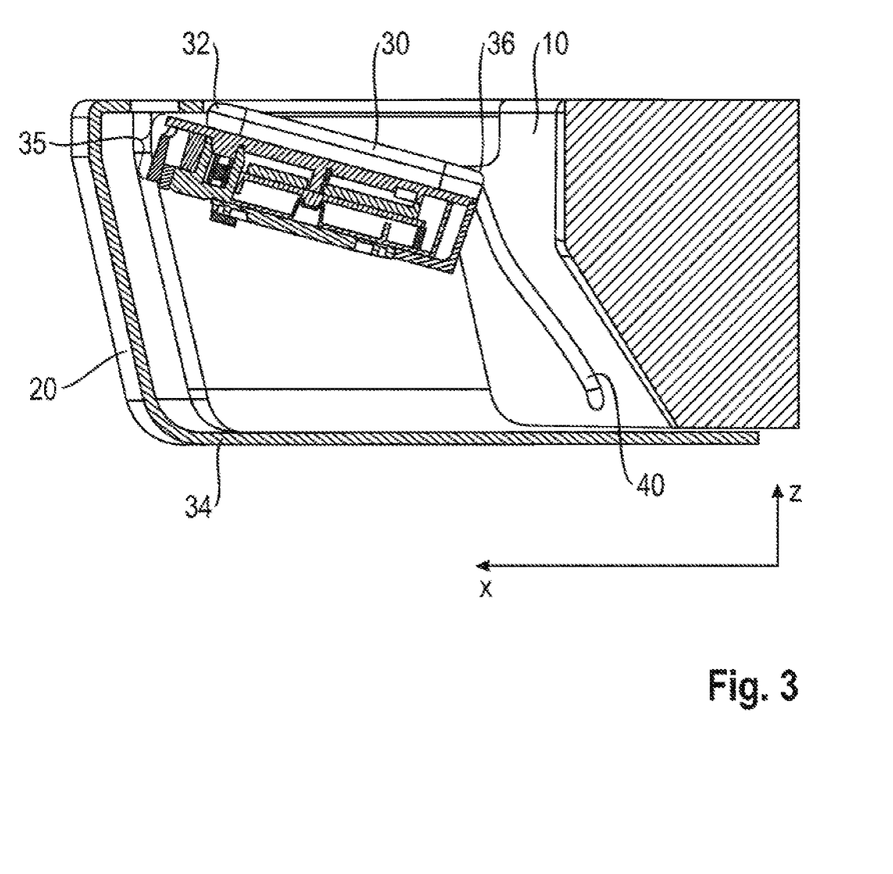
FIG. 3 schematically shows a cross section of the center console shown in FIG. 2.
Figure 4:
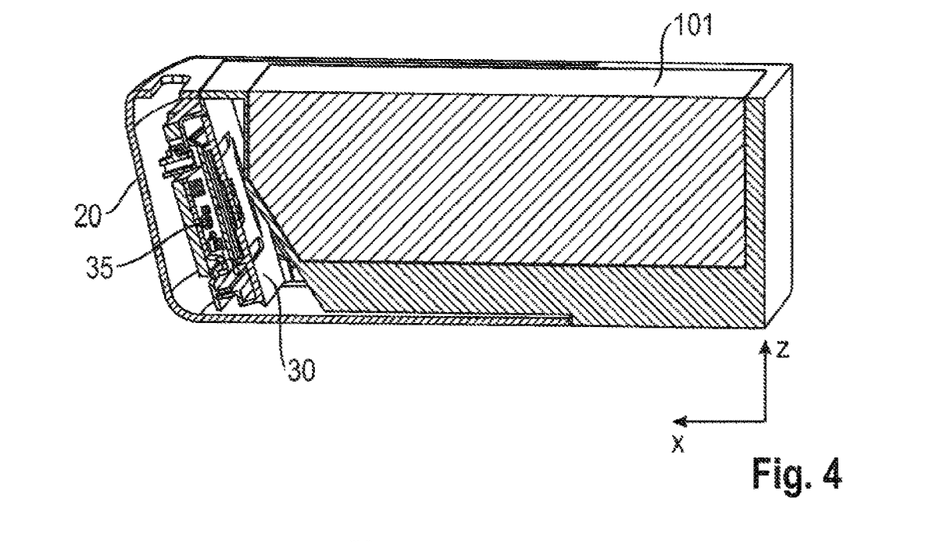
FIG. 4 is a schematic perspective cross-sectional view of the center console shown in FIG. 2, when the drawer is in a closed state.

With reference to FIGS. 2, 3 and 4, a first embodiment of the storage unit 1 according to the invention is described below, with FIG. 2 showing a schematic perspective view of the center console 100, when the drawer 20 is in the open state, FIG. 3 schematically showing a cross section of the center console 100, when the drawer 20 is in the open state, and FIG. 4 showing a schematic perspective cross-sectional view of the center console 100, when the drawer 20 is in the closed state.

As shown in FIG. 2, the drawer 20, with respect to the vehicle forward direction, has a front wall or end wall 21, and also a first and a second side wall 22, 23 which extend along the vehicle longitudinal direction X. On an upper side of the end wall 21, there is provided a cutout 24 which is configured in such a way that for example a smartphone can be inserted into the cutout 24 so that the smartphone is held securely and a large part of the display of the smartphone is visible. In the cross section along the plane which is defined by a vehicle vertical direction Z and a vehicle transverse direction Y, the first and the second side walls 22, 23 can be of for example C-shaped configuration, as shown in FIG. 2, and the side walls 11, 12 of the housing 10 can be configured in the form of guide units which are provided with correspondingly configured grooves 13, in order to guide the C-shaped side walls 22, 23 of the drawer 20 during the movement of the drawer 20 along the vehicle longitudinal direction X.

The storage unit 1 has a plate 30, which is provided in an interior of the drawer 20 and is supported, by means of a bearing unit which is attached to the drawer 20, in such a way that the plate 30 can be pivoted about a pivot axis S which extends along the vehicle transverse direction Y. In the embodiment which is shown in FIGS. 2, 3 and 4, the plate 30 is provided so that, in the open state of the drawer 20, it can be used as a base plate of a storage compartment, on which an article, such as, for example, the smartphone, can be placed.

For the purpose of pivoting the plate 30, a pivot mechanism is provided, which is configured to change a pivot angle of the plate 30, about the pivot axis S, relative to the vehicle longitudinal direction X in such a way that the pivot angle of the plate 30 in the closed state of the drawer 20, with respect to the vehicle longitudinal direction X, is greater than the pivot angle of the plate 30 in the open state of the drawer 30.

As shown in FIG. 2, the bearing unit has a first and a second bearing device, which are formed by respective through-holes 25 which extend through the first and second side walls 22, 23 of the drawer 20 in the vicinity of an end of the drawer 20, or of the end wall 21 of the drawer 20, said end being at the front with respect to the vehicle forward direction. In an embodiment which is not shown, the first and the second bearing devices can also be formed by respective blind holes which extend, from a respective inner side of a respective side wall 22, 23 of the drawer 20, in opposite directions along the vehicle transverse direction Y.

At a front end 32 of the plate 30, there are provided a first and a second bearing journal 33 which extend in opposite directions along the vehicle transverse direction Y, the first bearing journal being supported by the first bearing device, and the second bearing journal being supported by the second bearing device. In this case, as illustrated in FIG. 2, at the front end 32 of the plate 30, provision can be made for a first through-hole (not shown) which extends along the vehicle transverse direction Y and in which a first shaft 38 is provided. In said case, the first and the second bearing journals 33 can be formed by a respective end of the first shaft 38, said end projecting in each case laterally from the first through-hole. The pivot axis S about which the plate 30 can be pivoted is therefore defined by the first shaft 38.

As illustrated in FIG. 3, the pivot mechanism has at least one guide rail 40 and at least one guide pin (not shown), which engages into the at least one guide rail 40 and is guided by the latter along a guide path which is defined by the guide rail 40. Furthermore, the storage unit 1 is configured in such a way that a bottom 34 of the drawer 30 is at least partially arranged, in the closed state of the drawer 30, below the operator control panel 101.

In the cross section which is shown in FIG. 3, only a first guide rail 40 is visible, which is mounted on an inner side surface of a side wall 22, 23 of the housing 10. However, the storage unit 1 is preferably configured in such a way that a second guide rail is provided, on the inner side surface of the other side wall 22, 23 of the drawer 20, in a mirror-inverted manner with respect to the guide rail 40 which is shown in FIG. 3. In said case, at an end 36 of the plate 30, said end being at the rear with respect to the vehicle forward direction, there are provided first and second guide pins (not shown) which extend in opposite directions along the vehicle transverse direction Y, the first guide pin being guided by the first guide rail 40 and the second guide pin being guided by the second guide rail 40.

In this case, at the rear end 36 of the plate 30, provision can be made for a second through-hole (not shown) which extends along the vehicle transverse direction Y and in which a second shaft (not shown) is provided. In said case, the first and the second guide pins can be formed by a respective end of the second shaft, said end projecting in each case laterally from the second through-hole.

The first and the second guide rails 40 are configured in such a way that the first and the second guide pins are guided along a guide path which runs, proceeding from the closed state of the drawer 20 to the open state of the drawer 30, obliquely forward and upward with respect to the vehicle forward direction X and the vehicle vertical direction Z. In this case, the guide path can run in a curved manner, as illustrated in FIG. 3. In an embodiment which is not shown, the guide path can also run in a rectilinear manner.

Since the position of the front end 32 of the plate 30 is substantially positionally fixed, with respect to the drawer 20, by the bearing unit, the first and the second guide pins move along the first and the second guide rails relative to the first and the second guide rails 40 during a movement of the drawer 20 relative to the housing 10 along the vehicle longitudinal direction X.

As a result of said relative movement, the pivot angle of the plate 30 decreases gradually with respect to the vehicle longitudinal direction X during a movement of the drawer 20 from the closed state to the open state.

The pivot mechanism is configured in particular in such a way that, with respect to the vehicle vertical direction Z, the rear end 36 of the plate 30 is located at a lower level in the closed state than in the open state. In this case, the pivot mechanism is preferably configured in such a way that the pivot angle of the plate 30 in the closed state of the drawer 20 is virtually 90°, as illustrated in FIG. 4. In this way, only a small amount of installation space along the vehicle longitudinal direction X is necessary for receiving the plate 30 if the plate 30 is not required as a storage surface.

As illustrated in FIGS. 3 and 4, the storage unit 1 has a charging device 35, which is configured to wirelessly charge a rechargeable battery of a portable device, such as, for example, of the smartphone, when the portable device is resting on the plate 30 in the open state of the drawer 20. The charging device 35 is provided on an underside of the plate 30 and has connections (not shown) which are configured to be connected to a battery of the vehicle, in order to provide electrical energy for charging the rechargeable battery of the portable device. The user, if they would like to put down or charge their portable device, can thus shift the drawer 20 into the open state and place the portable device onto the plate 20. By contrast, if the user does not require the storage surface which is provided by the open drawer 20, they can close the drawer 20, as a result of which a larger amount of free space is created in front of the center console 100.

The pivot mechanism is preferably configured in such a way that, in the completely open state of the drawer 20, as illustrated in FIGS. 2 and 3, the pivot angle of the plate 30 is adjusted in such a way that the user has a good view of a display of a smartphone which is placed on the plate 20. In this case, in the completely open state of the drawer 20, the pivot angle of the plate 20 is adjusted, depending on the position of the storage unit 1 or of the plate 30 in the vehicle, and can be, for example, in the range of 15° to 30°.

Figure 5:
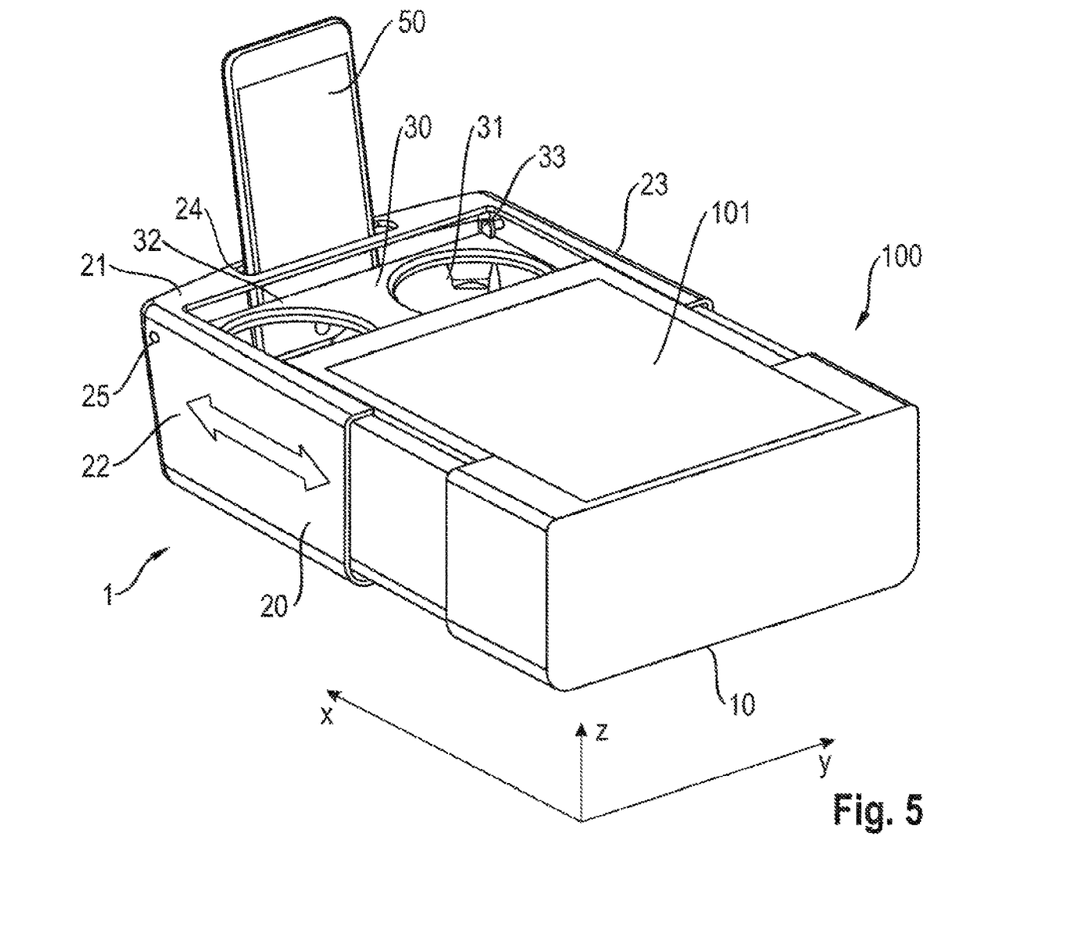
FIG. 5 is a schematic perspective view of a center console with a storage unit according to a second embodiment, when a drawer of the storage unit is in an open state.
Figure 6:
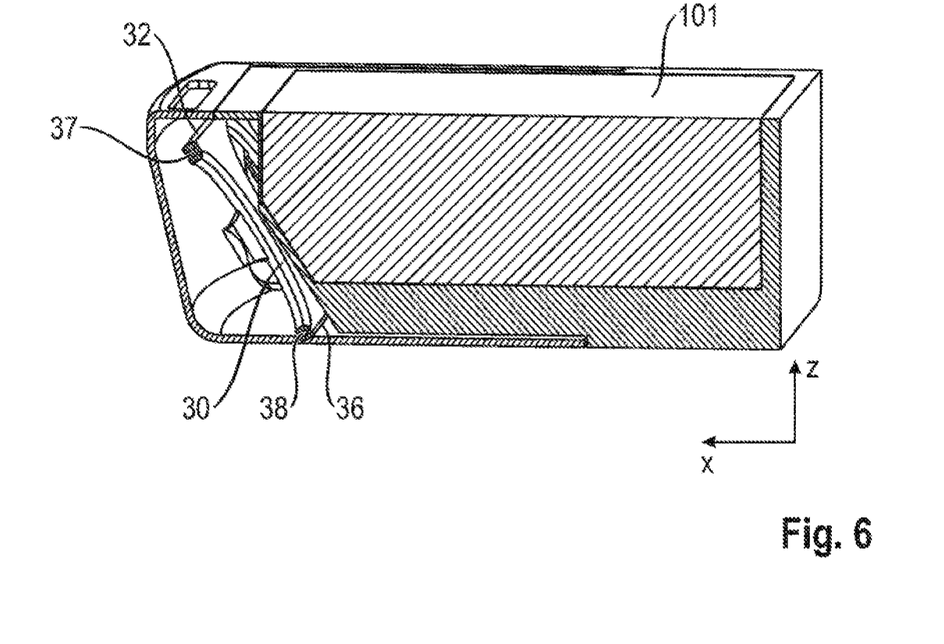
FIG. 6 shows a schematic perspective cross-sectional view of the center console shown in FIG. 5, when the drawer is in a closed state.

With reference to FIGS. 5 and 6, a second embodiment of the storage unit 1 according to the invention is described below, with FIG. 5 showing a schematic perspective view of the center console 100, when the drawer 20 is in the open state, and FIG. 6 showing a schematic perspective cross-sectional view of the center console 100, when the drawer 20 is in the closed state.

In contrast to the first embodiment which is illustrated in FIGS. 2, 3 and 4, the plate 30 in the second embodiment is provided for use as drink holder. For this purpose, as illustrated in FIG. 5, the plate 30 has a plurality of holes 31 which are configured so that, in the open state of the drawer 20, they can receive a drink cup. If the holes 31 are of circular configuration, the pivot mechanism is preferably configured in such a way that, in the completely open state, the pivot angle of the plate 30 is approximately 0° with respect to the vehicle longitudinal direction X. In other cases, in which the holes 31 are of oval configuration, it is possible, in the completely open state of the drawer 20, for the pivot angle of the plate 30 to be correspondingly adapted in order to ensure a good holding action for the drinks cup.

In addition to the possibility of inserting the drink cup into one of the holes 31 in the open state of the drawer 20, the user can insert a smartphone 50 into the cutout 24 both in the open and in the closed state of the drawer 20.

FIG. 5 illustrates one of the bearing journals 33 which has been described with respect to the first embodiment of the storage unit 1 and which is formed by an end of the first shaft 38 and is supported in the second side wall 22 of the drawer 20 by means of the through-hole 25. Furthermore, FIG. 6 illustrates the first through-hole 37 at the front end 32 of the plate 30, said first through-hole having been described with respect to the first embodiment and having the first shaft 38 provided therein, and the second through-hole 39 at the rear end 36 of the plate 20, said second through-hole having been described with respect to the first embodiment and having the second shaft provided therein.

What is claimed is:

1. A storage unit for a vehicle, comprising:
a housing;
a drawer which, during intended use, is movable relative to the housing along a vehicle longitudinal direction between a closed state and an open state;
a plate which is supported by a bearing unit which is attached to the drawer such that the plate is pivotable about a pivot axis which extends along a vehicle transverse direction, the plate having an end which is at a front with respect to a vehicle forward direction and an end which is at a rear with respect to the vehicle forward direction; and
a pivot mechanism which is configured to change a pivot angle of the plate relative to the vehicle longitudinal direction such that the pivot angle of the plate in the closed state is greater than the pivot angle of the plate in the open state, wherein
the plate is configured so that, in the open state of the drawer, the plate is usable as a base plate of a storage compartment which is intended for storing an article, and/or
the plate has a hole which is configured, in the open state of the drawer, to receive a cup.

2. The storage unit according to claim 1, wherein
the pivot mechanism is configured to change the pivot angle of the plate, depending on a position of the drawer relative to the housing, along the vehicle longitudinal direction such that, with respect to a vehicle vertical direction, the rear end of the plate is located at a lower position in the closed state than in the open state.

3. The storage unit according to claim 1, wherein
at the front end of the plate, a first and a second bearing journal extend in opposite directions along the vehicle transverse direction, and
the bearing unit comprises a first bearing device, which supports the first bearing journal, and a second bearing device, which supports the second bearing journal.

4. The storage unit according to claim 3, wherein
at the front end of the plate, a first through-hole extends along the vehicle transverse direction,
a first shaft is provided in the first through-hole,
the first and the second bearing journals are formed by a respective end of the first shaft, said end projecting from the first through-hole, and
the first and the second bearing devices are formed by a respective rotary bearing which is configured in a respective side wall of the drawer.

5. The storage unit according to claim 1, wherein
the pivot mechanism has at least one guide rail and at least one guide pin, which engages into the at least one guide rail,
the storage unit is configured such that, during a movement of the drawer relative to the housing along the vehicle longitudinal direction, the at least one guide pin moves along a guide path relative to the at least one guide rail, said guide path being defined by the at least one guide rail, and
the pivot angle of the plate is changed as a result of the relative movement of the at least one guide pin with respect to the at least one guide rail.

6. The storage unit according to claim 5, wherein
the at least one guide rail is mounted on the housing, and
the at least one guide pin is mounted on the plate.

7. The storage unit according to claim 6, wherein
at the rear end of the plate, a first and a second guide pin extend in opposite directions along the vehicle transverse direction, and
the at least one guide rail comprises a first guide rail, into which the first guide pin engages, and a second guide rail, into which the second guide pin engages.

8. The storage unit according to claim 7, wherein
at the rear end of the plate, a second through-hole extends along the vehicle transverse direction,
a second shaft is provided in the second through-hole,
the first and the second guide pins are formed by a respective end of the second shaft, said end projecting from the second through-hole, and
the first and the second guide rails are provided on a respective inner side surface of a respective side wall of the housing.

9. The storage unit according to claim 5, wherein
the at least one guide rail is mounted on a side surface of the plate, and
the at least one guide pin is mounted on an inner side surface of a side wall of the housing.

10. The storage unit according to claim 1, further comprising:
a charging device which is configured to wirelessly charge a rechargeable battery of a portable device when the portable device is resting on the plate.

11. The storage unit according to claim 1, wherein
the pivot mechanism is configured such that, in a completely open state of the drawer, the front end of the plate is located at a higher level, with respect to the vehicle vertical direction, than the rear end of the plate.

12. A center console for a vehicle, comprising:
a storage unit according to claim 1, wherein
the housing of the storage unit is formed by a housing of the center console.

13. The center console according to claim 12, wherein the center console is a self-supporting center console.

14. A vehicle, comprising:
a center console according to claim 12, wherein
the center console extends, between front seats of the vehicle, along the vehicle longitudinal direction.

\* \* \* \* \*